United States Patent
Park et al.

(10) Patent No.: US 11,312,639 B2
(45) Date of Patent: Apr. 26, 2022

(54) WATER PURIFIER AND FILTER FOR THE SAME

(71) Applicant: Samsung Electronics Co., Ltd., Suwon-si (KR)

(72) Inventors: Jungha Park, Suwon-si (KR); Jongho Lee, Suwon-si (KR); Yeonwoo Cho, Suwon-si (KR); Sungpil Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/003,205

(22) Filed: Aug. 26, 2020

(65) Prior Publication Data

US 2021/0061676 A1 Mar. 4, 2021

(30) Foreign Application Priority Data

Sep. 2, 2019 (KR) .................. 10-2019-0108433

(51) Int. Cl.
*C02F 1/00* (2006.01)
*B01D 35/16* (2006.01)
(Continued)

(52) U.S. Cl.
CPC .............. *C02F 1/001* (2013.01); *B01D 35/16* (2013.01); *B01D 65/02* (2013.01); *C02F 1/32* (2013.01);
(Continued)

(58) Field of Classification Search
CPC ........ B01D 2311/2692; B01D 2321/04; B01D 2321/10; B01D 35/16; B01D 65/02;
(Continued)

(56) References Cited

U.S. PATENT DOCUMENTS

| 5,037,547 A * | 8/1991 | Burrows | ................ B01D 63/10 210/232 |
| 7,608,184 B2 | 10/2009 | Weindorf et al. | |

(Continued)

FOREIGN PATENT DOCUMENTS

| CN | 108793325 A | 11/2018 |
| CN | 110013696 B | 7/2021 |

(Continued)

OTHER PUBLICATIONS

International Search Report dated Dec. 28, 2020, issued in International Application No. PCT/KR2020/011403.

*Primary Examiner* — Terry K Cecil
(74) *Attorney, Agent, or Firm* — Jefferson IP Law, LLP

(57) ABSTRACT

A water purifier and a filter for the water purifier are provided. The water purifier includes a raw water flow path formed to bring in raw water from the outside, a purified water flow path connected to the raw water flow path for the raw water to flow in a first direction, a filter located in the purified water flow path to filter the raw water, a bypass flow path branched from the purified water flow path for the raw water to bypass the filter and connected to the purified water flow path on a downstream side of the filter in the first direction, a washing flow path branched from the bypass flow path and connected to the purified water flow path on a downstream side of the filter in the first direction, and a drain flow path connected to the filter to guide the raw water flowing into the filter to a second direction. The filter includes a raw water inlet through which raw water flowing in the first direction is introduced, a purified water outlet (Continued)

through which purified water filtered is released, and a drain outlet through which wash water having washed the filter is discharged.

18 Claims, 12 Drawing Sheets

(51) Int. Cl.
*C02F 1/32* (2006.01)
*B01D 65/02* (2006.01)

(52) U.S. Cl.
CPC .. *B01D 2311/2692* (2013.01); *B01D 2321/04* (2013.01); *B01D 2321/10* (2013.01); *C02F 2201/005* (2013.01); *C02F 2201/46145* (2013.01); *C02F 2301/043* (2013.01); *C02F 2303/04* (2013.01); *C02F 2303/16* (2013.01)

(58) Field of Classification Search
CPC .............. B01D 29/66; B01D 2201/08; B01D 24/4631; C02F 1/001; C02F 1/283; C02F 1/32; C02F 2201/005; C02F 2201/006; C02F 2201/46145; C02F 2301/043; C02F 2303/04; C02F 2303/16; C02F 2303/24
USPC ........................................................ 210/423
See application file for complete search history.

(56) References Cited

U.S. PATENT DOCUMENTS

| | | | |
|---|---|---|---|
| 8,486,275 | B2 | 7/2013 | Wolf |
| 10,266,441 | B2 | 4/2019 | Lee et al. |
| 10,905,986 | B2 * | 2/2021 | Park ..................... B01D 65/027 |
| 2010/0044295 | A1 | 2/2010 | Honermann et al. |
| 2015/0225259 | A1 * | 8/2015 | Yamaoka .............. F16K 31/524 |
| | | | 137/865 |
| 2017/0129795 | A1 * | 5/2017 | Singh ................... B01D 61/025 |
| 2018/0370831 | A1 | 12/2018 | Moon et al. |
| 2019/0111365 | A1 | 4/2019 | Park et al. |

FOREIGN PATENT DOCUMENTS

| | | |
|---|---|---|
| KR | 10-0613853 B1 | 8/2006 |
| KR | 10-2009-0025892 A | 3/2009 |
| KR | 10-0912186 B1 | 8/2009 |
| KR | 10-1193544 B1 | 10/2012 |
| KR | 10-2016-0031133 A | 3/2016 |
| KR | 10-2016-0105262 A | 9/2016 |
| KR | 10-1954760 B1 | 3/2019 |
| KR | 20-2019-0001450 U | 6/2019 |
| WO | WO-2007082033 A2 * | 7/2007 ............ B01D 35/16 |

* cited by examiner

WATER PURIFIER AND FILTER FOR THE SAME

CROSS-REFERENCE TO RELATED APPLICATION(S)

This application is based on and claims priority under 35 U. S. C. § 119 of a Korean patent application number 10-2019-0108433, filed on Sep. 2, 2019, in the Korean Intellectual Property Office, the disclosure of which is incorporated by reference herein in its entirety.

BACKGROUND

1. Field

The disclosure relates to a water purifier and a filter for the water purifier. More particularly, the disclosure relates to a water purifier with a washable filter for water purification.

2. Description of Related Art

Water purifiers are devices for filtering incoming water with one or more purification filters to supply clean water to the user. The purification filter filters off various types of contaminants and the contaminants may be accumulated inside the purification filter. In this case, the filtering function of the filter deteriorates or the filter impedes the flow of water, making it impossible to reach an amount of water purification that satisfies the user. Furthermore, microorganisms brought in together with the contaminants proliferate by getting nutrition from organic substances inside, causing nasty smell and taste from the purified water. Moreover, replacing the water purification filter with a new one annoys the user and requires some expenses.

Hence, as for a water purifier having a type that washes the water purification filter, the existing water purifier has a system that closes a raw water valve and uses wash water stored in a storage tank. In this case, such a storage tank is required to store the wash water. In addition, a pump for supplying water in the opposite direction to a set water flow direction is required. In this case, as the wash water is stored in the storage tank for a long time, the wash water may be exposed to contamination and more parts may be required inside the water purifier.

Furthermore, a valve used for flow path switching is vulnerable to water leaks and pressure, and thus expensive parts may be required.

Moreover, on an occasion when a filter that has been overly contaminated due to difficulty in determining a time for washing with naked eyes is washed, the filter may not be completely washed.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a water purifier having an improved structure for washing a filter.

Another aspect of the disclosure is to provide a water purifier that avoids contamination of wash water because there is no tank for storing the wash water that may become stagnant water.

Another aspect of the disclosure is to provide a water purifier that simplifies a flow path structure by placing a drain outlet for draining wasted water resulting from washing a filter inside a filter cap.

Additional aspects will be set forth in part in the description which follows and, in part, will be apparent from the description, or may be learned by practice of the presented embodiments.

In accordance with an aspect of the disclosure, a water purifier is provided. The water purifier includes a raw water flow path formed to bring in raw water from the outside, a purified water flow path connected to the raw water flow path for the raw water to flow in a first direction, a filter located in the purified water flow path to filter the raw water, a bypass flow path branched from the purified water flow path for the raw water to bypass the filter and connected to the purified water flow path on a downstream side of the filter in the first direction, a washing flow path branched from the bypass flow path and connected to the purified water flow path on a downstream side of the filter in the first direction, a purified water discharge valve configured to open or close the purified water flow path for the raw water having passed the bypass flow path or the washing flow path to flow in the purified water flow path in the first direction or a second direction opposite to the first direction, and a drain flow path connected to the filter to guide the raw water flowing into the filter to a second direction, The filter may include a raw water inlet, through which raw water flowing in the first direction is brought in, a purified water outlet through which purified water filtered is released, and a drain outlet through which wash water having washed the filter is discharged, and based on the filter being washed, the raw water flowing in the second direction may be brought into the filter through the purified water outlet and discharged from the filter through the drain outlet.

The filter may include a filter cap formed on one side of the filter and connected to the purified water flow path and the drain water path, a filter housing coupled to the filter cap and formed by extending from the filter cap, and a filter body provided inside the filter housing to filter the raw water.

The raw water inlet, the purified water outlet, and the drain outlet may be provided on the filter cap.

The filter housing may include an outer housing defining an outer look of the filter, and an inner housing formed apart from the outer housing and accommodating the filter body.

Based on the filter being washed, wash water having washed the filter may flow into a gap between the outer housing and the inner housing and may be discharged to the outside.

The bypass flow path may include a sterilization water producing device to allow washing with sterilized water based on the filter being washed or a flow path being washed.

The bypass flow path may include a sterilization flow path including the sterilization water producing device, and a connection flow path connected to the sterilization flow path.

The purified water flow path may include a purified water inflow valve to check flows of the raw water into the purified water flow path.

The water purifier may include a filter washing mode in which, for washing the filter, and the purified water discharge valve and the purified water inflow valve are closed for the raw water to pass the bypass flow path and the washing flow path and flow in the purified water flow path in the second direction.

The water purifier may further include at least one processor configured to control the purified water discharge valve and the purified water inflow valve and receive information about an amount of purified water measured from a flowmeter, The at least one processor may further be configured to control the filter to be washed automatically based on a set amount of purified water being reached.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
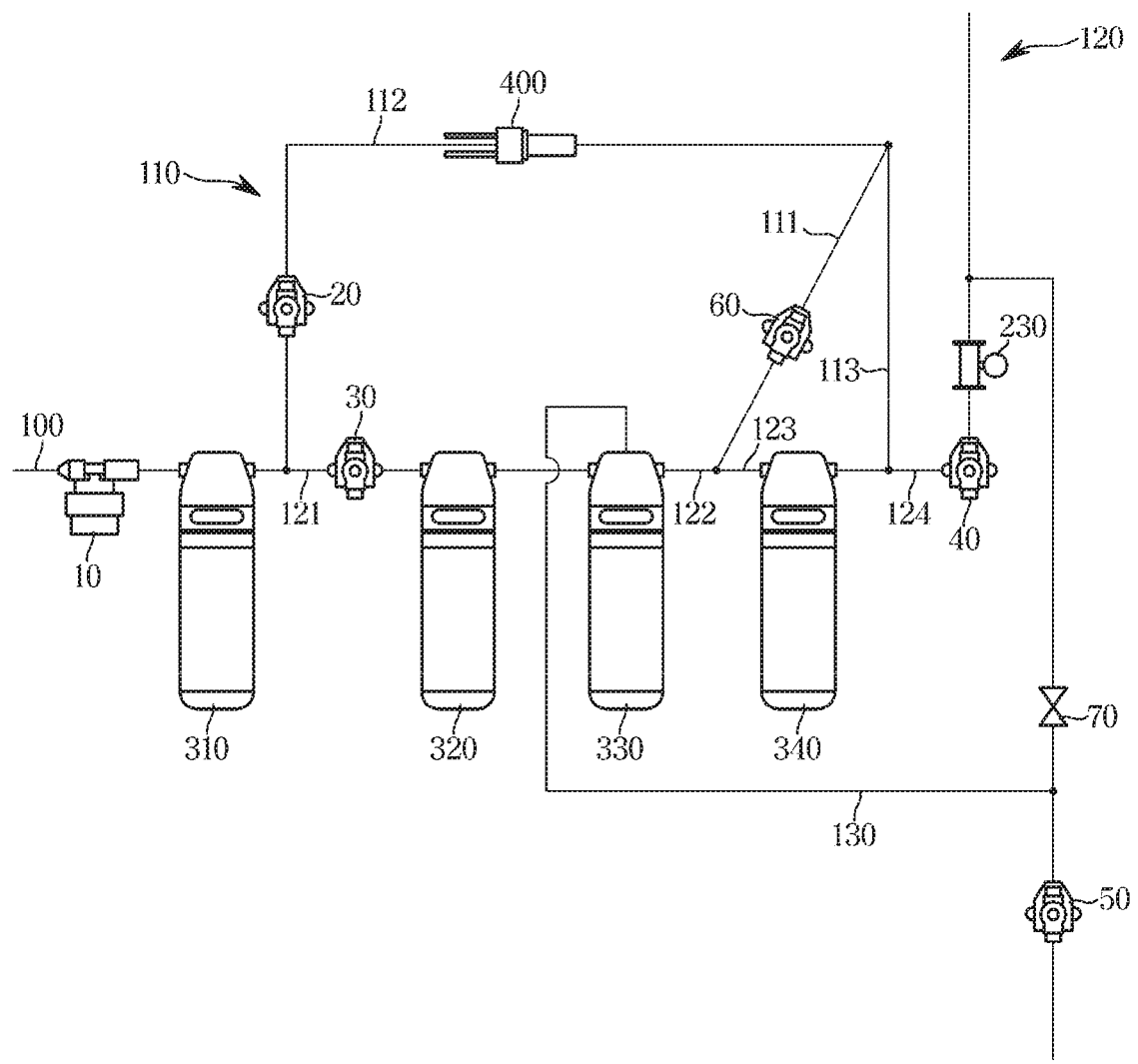
FIG. 1 is a diagram illustrating a water purifier according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded are merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It is to be understood that the singular forms "a," "an," and "the" include plural references unless the context clearly dictates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The terms including ordinal numbers like "first" and "second" may be used to explain various components, but the components are not limited by the terms. The terms are only for the purpose of distinguishing a component from another. Thus, a first element, component, region, layer or chamber discussed below could be termed a second element, component, region, layer or section without departing from the teachings of the disclosure. Descriptions shall be understood as to include any and all combinations of one or more of the associated listed items when the items are described by using the conjunctive term "~ and/or ~," or the like.

The terms "up-down direction", "lower side" and "front-rear direction" as herein used are defined with respect to the drawings, but the terms may not restrict the shape and position of the respective components.

Reference will now be made in detail to embodiments of the disclosure, which are illustrated in the accompanying drawings, wherein like reference numerals refer to the like elements throughout.

FIG. 1 is a diagram illustrating a water purifier according to an embodiment of the disclosure.

Referring to FIG. 1, the water purifier 1 may include a raw water flow path 100 provided to bring in raw water from the outside.

The water purifier 1 may include a purified water flow path 120 connected to the raw water flow path 100 for the raw water to flow in a first direction. The purified water flow path 120 may include a first filter 330 arranged therein for filtering the raw water. The first filter 330 may include a membrane filter.

The water purifier 1 may include a bypass flow path 110 branched from the purified water flow path 120 for the raw water to bypass the first filter 330, and connected to the purified water flow path 120 on the downstream side of the first filter 330 in the first direction.

The water purifier 1 may include a washing flow path 111 separately formed by being branched from a middle of the bypass flow path 110, and connected to the purified water flow path 120 on the downstream side of the first filter 330 in the first direction.

The bypass flow path 110 may include a sterilization flow path 112 provided farther upstream than the branch point of the washing flow path 111. The bypass flow path 110 may also include a connection flow path 113 provided farther downstream than the branch point of the washing flow path 111.

The sterilization flow path 112 may include a bypass valve 20 for opening or closing the flow path to allow or not allow the raw water to flow in the bypass flow path 110. It may also include a sterilization water producing device 400 for producing sterilized water.

The purified water flow path 120 may include a purified water inflow valve 30 for opening or closing the flow path to allow or not allow the raw water to flow in the purified water flow path 120. It may also include a purified water discharge valve 40 for opening or closing the purified water flow path 120 to allow the raw water that has passed the washing flow path 111 to flow in the first direction or a second direction opposite to the first direction.

The purified water flow path 120 may include a first purified water flow path 121, a second purified water flow path 122, a third purified water flow path 123, and a fourth purified water flow path 124.

The first purified water flow path 121 may be connected to the raw water flow path 100 and formed on the upstream side of the first filter 330 in the first direction. The second purified water flow path 122 may be formed from the downstream side of the first filter 330 in the first direction to a connection point between the washing flow path 111 and the purified water flow path 120. The third purified water flow path 123 may be connected to the second purified water flow path 122 and formed to reach a point at which the bypass flow path 110 and the purified water flow path 120 join. The fourth purified water flow path 124 may be connected to the third purified water flow path 123 and formed to face the outside.

The water purifier 1 may include a drain water flow path 130 connected to the first filter 330 for the raw water flowing in the second direction from the washing flow path 111 to pass the first filter 330 to wash the first filter 330 and guide the wash water containing contaminants.

The drain water flow path 130 may include a wash water discharge valve 50 for opening or closing the flow path to allow or not allow the raw water to flow into the drain water flow path 130.

The washing flow path 111 may include a washing valve 60 for opening or closing the flow path to allow or not allow the raw water to flow into the washing path 111.

There may be a decompression valve 10 provided in the raw water flow path 100 to reduce water pressure of the raw water. The raw water flow path 100 may also include a second filter 310 to filter out large particles from the raw water. The second filter 310 may include a high turbidity filter.

The purified water flow path 120 may further include a third filter 320 and a fourth filter 340. The third filter 320 may include a pre-carbon filter, and the fourth filter 340 may include a post-carbon filter.

The purified water flow path 120 may further include a flowmeter 230 for measuring an amount of purified water.

A flow path connecting the purified water flow path 120 to the drain water flow path 130 may include a check valve 70 for the raw water to flow in one direction.

The sterilization water producing device 400 may be an electrolysis device, an ultraviolet (UV) lamp, or a light emitting diode (LED) module.

Figure 2:
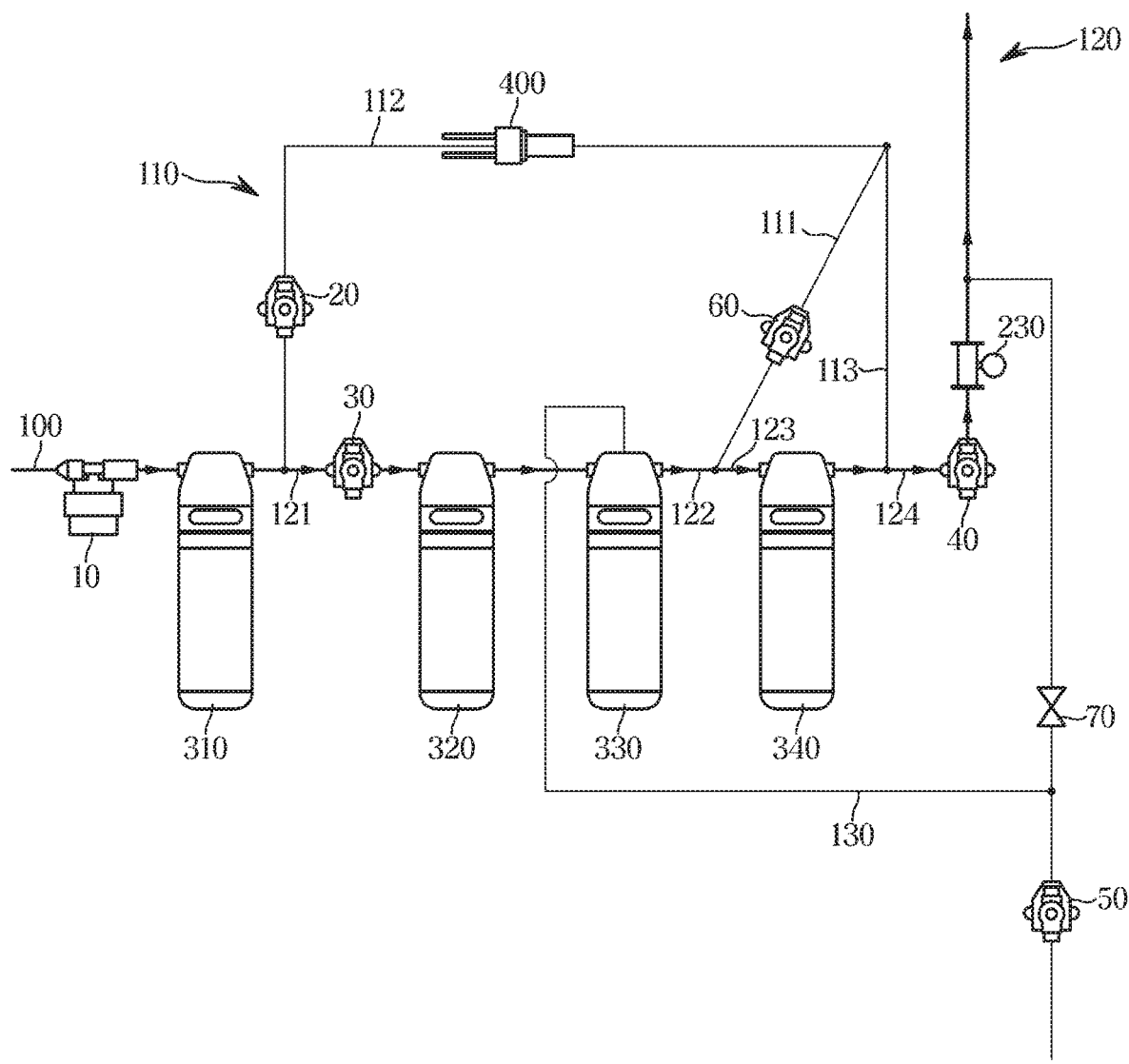
FIG. 2 is a diagram illustrating the water purifier of FIG. 1 supplying purified water for the user by filtering raw water according to an embodiment of the disclosure.

FIG. 2 is a diagram illustrating the water purifier of FIG. 1 supplying purified water for the user by filtering raw water according to an embodiment of the disclosure.

Referring to FIG. 2, raw water is first brought in from the outside through the raw water flow path 100. The decompression valve 10 may decompress the raw water. The decompressed raw water may be primarily filtered by passing the second filter 310. The bypass valve 20 installed in the bypass flow path 110 is closed and the purified water inflow valve 30 installed in the purified water flow path 120 is opened, so that the raw water flows into the first purified water flow path 121. The raw water may be filtered while passing the first filter 330, and the wash water discharge valve 50 installed in the drain flow path 130 is closed for the purified water filtered to flow in the second purified water flow path in the first direction. The washing valve 60 installed in the washing flow path 111 is closed and the purified water discharge valve 40 installed in the fourth purified water flow path 124 is opened, so that the purified water is released to the outside. This may be called a water purification mode.

Figure 3:
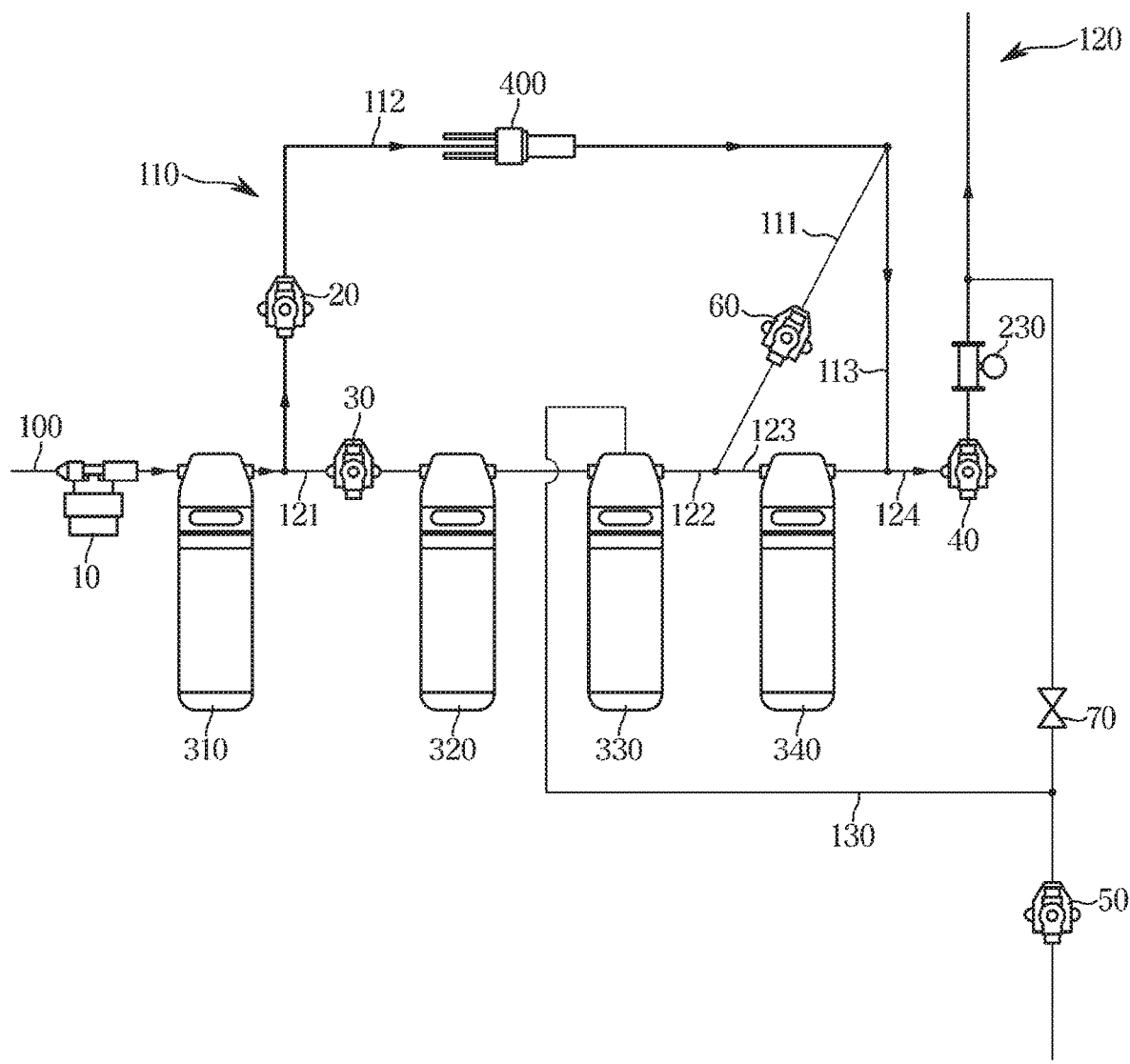
FIG. 3 is a diagram illustrating the water purifier of FIG. 1 sterilizing water and bypassing a plurality of filtering elements according to an embodiment of the disclosure.

FIG. 3 is a diagram illustrating the water purifier of FIG. 1 sterilizing water and bypassing a plurality of filtering elements according to an embodiment of the disclosure.

Referring to FIG. 3, raw water is first brought in from the outside through the raw water flow path 100. The decompression valve 10 may decompress the raw water. The decompressed raw water may be primarily filtered by passing the second filter 310. The bypass valve 20 installed in the bypass flow path 110 is opened and the purified water inflow valve 30 installed in the purified water flow path 120 is closed, so that the raw water flows into the bypass flow path 110. The raw water turns to sterilized water by the sterilization water producing device 400 installed in the sterilization flow path 112. The washing valve 60 installed in the washing flow path 111 is opened, so that the sterilized water passes the washing flow path 111 and joins the purified water flow path 120. The purified water discharge valve 40 is closed, so that the sterilized water passes the second purified water flow path 122 in the second direction opposite to the first direction. The sterilized water flowing in the second purified water flow path 122 in the second direction passes the first filter 330 in an opposite direction to a filtering direction of the filter to wash the first filter 330. The wash water discharge valve 50 installed in the drain flow path 130 is opened, so that the wash water containing contaminants is discharged through the drain flow path 130.

As described above, unlike the case of supplying purified water as shown in FIG. 2 where the raw water flows in the second purified water flow path 122 in the first direction, in the case of washing the filter as shown in FIG. 3, the sterilized water flows in the second purified water flow path 122 in the second direction. This may make the filter washed in the opposite direction to a filtering direction of the filter.

In this embodiment of the disclosure, an occasion when the first filter 330 is washed is described. It is not, however, limited thereto, and other filter than the first filter 330 may be washed. For example, when a water purifying filter to be washed is the third filter 320, the washing flow path 111 may be connected to the purified water flow path 120 on the downstream side of the third filter 320 in the first direction. Furthermore, the drain flow path 130 may be connected to the third filter 320.

Although only one filter is shown as being washed in this embodiment, a plurality of filters may be washed. In this case, the washing flow path 111 is branched into multiple ones, each being connected to the purified water flow path 120 on the downstream side of each filter in the first direction. Furthermore, a plurality of drain flow paths 130 may also be connected to the respective filters, and all the drain flow paths 130 join together and discharge the wash water containing contaminants all at once. The plurality of washing flow paths 111 and the plurality of drain flow paths 130 may be connected in parallel.

Such an occasion when the filter is washed in an opposite direction to the filtering direction is called a filter washing mode.

Figure 4:
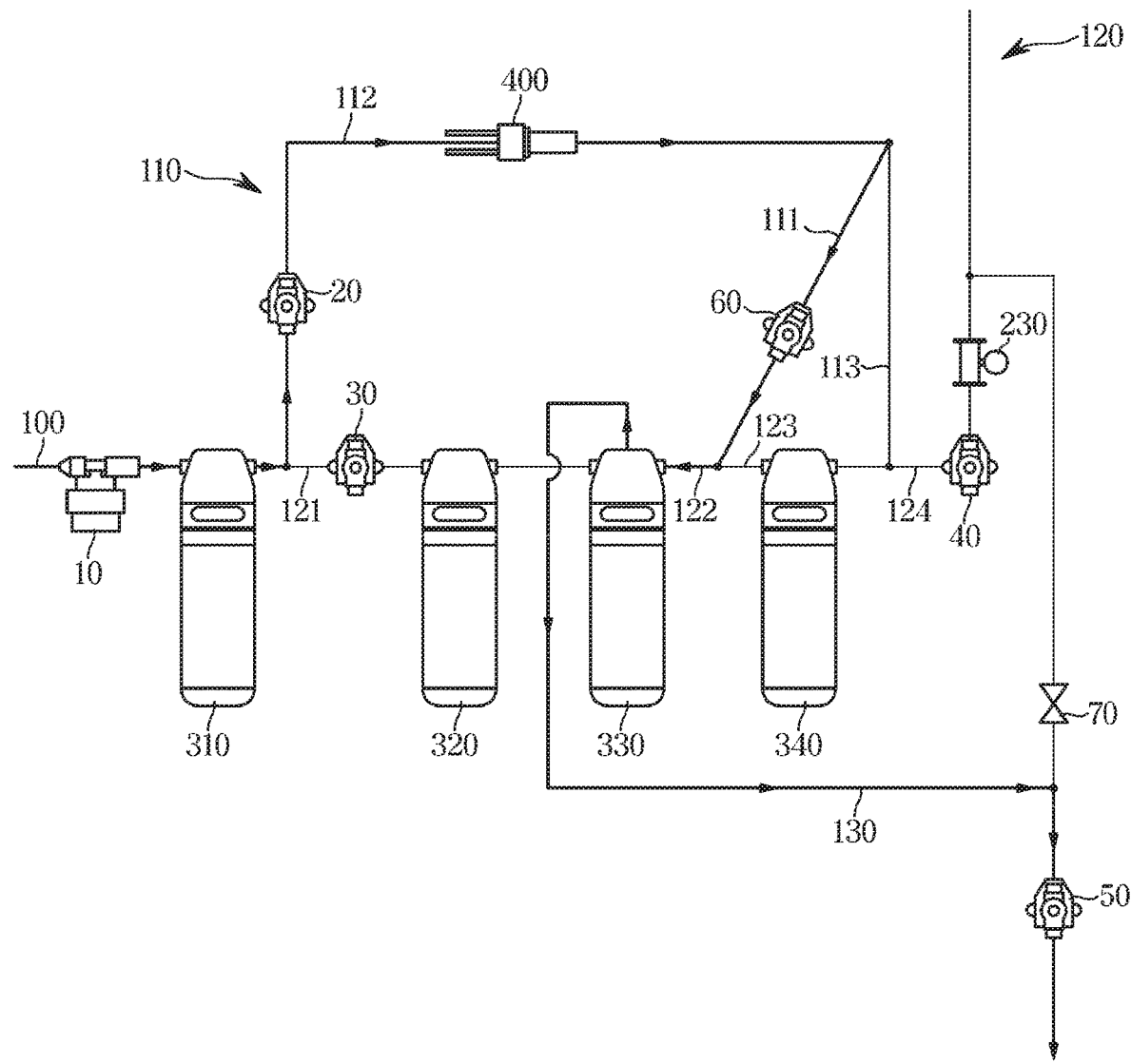
FIG. 4 is a diagram illustrating the water purifier of FIG. 1 washing a filter according to an embodiment of the disclosure.

FIG. 4 is a diagram illustrating the water purifier of FIG. 1 washing a filter according to an embodiment of the disclosure.

Referring to FIG. 4, raw water is first brought in from the outside through the raw water flow path 100. The decompression valve 10 may decompress the raw water. The bypass valve 20 installed in the bypass flow path 110 is opened and the purified water inflow valve 30 installed in the purified water flow path 120 is closed, so that the raw water flows into the bypass flow path 110. The raw water turns to sterilized water by the sterilization water producing device 400 installed in the sterilization flow path 112. The washing valve 60 installed in the washing flow path 111 is closed, so that the sterilized water passes the connection flow path 113 and joins the purified water flow path 120. The purified water discharge valve 40 is opened and the wash water discharge valve 50 is closed, so that the sterilized water flows in the fourth purified water flow path 124 in the first direction. This may make the fourth purified water flow path 124, though which purified water is released, washed with the sterilized water. Accordingly, the sterilized water may wash a tube without passing a filter. This may be called a tube washing mode.

Figure 5:
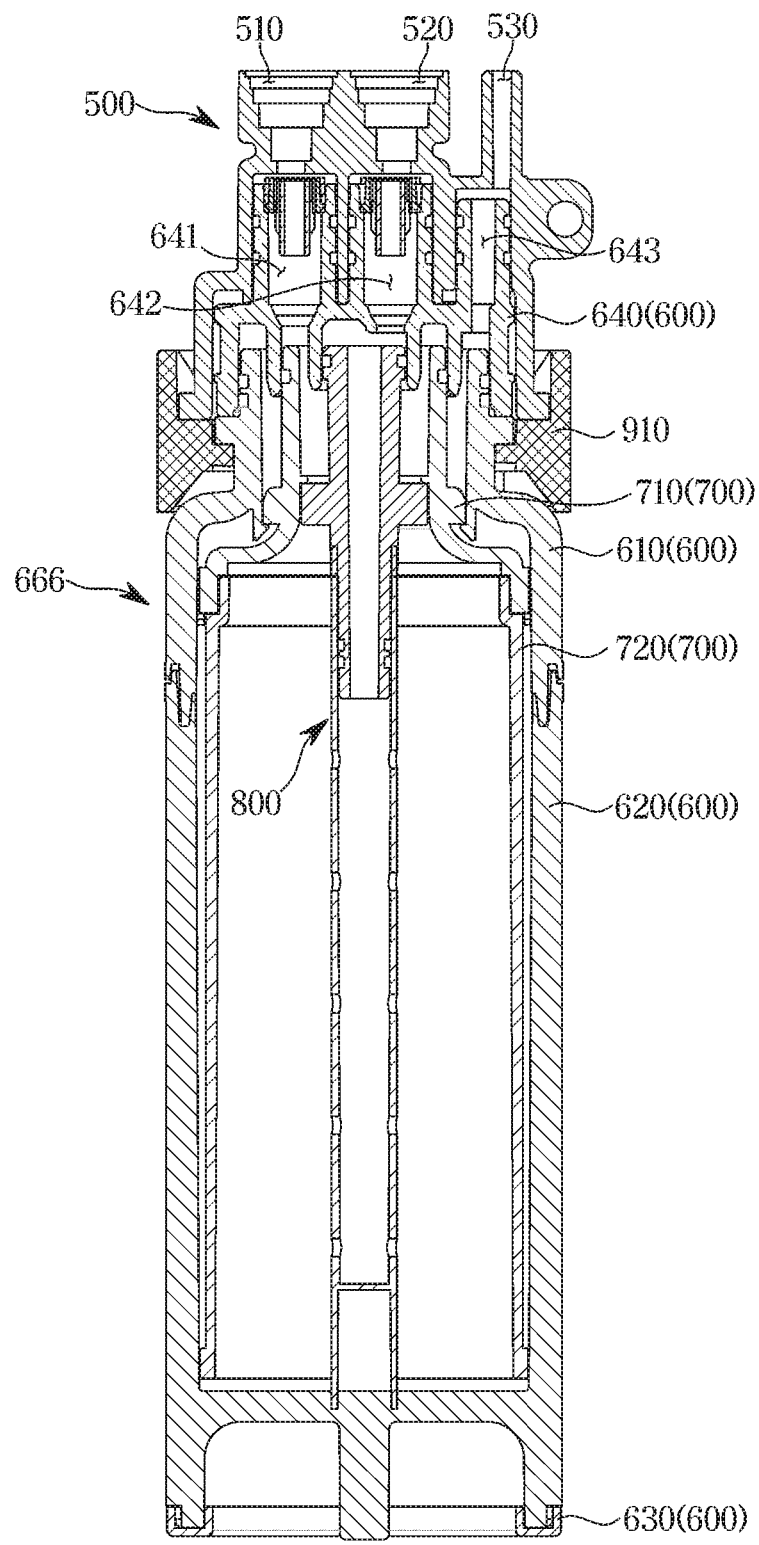
FIG. 5 is a cross-sectional view of a filter of a water purifier, according to an embodiment of the disclosure.
Figure 6:
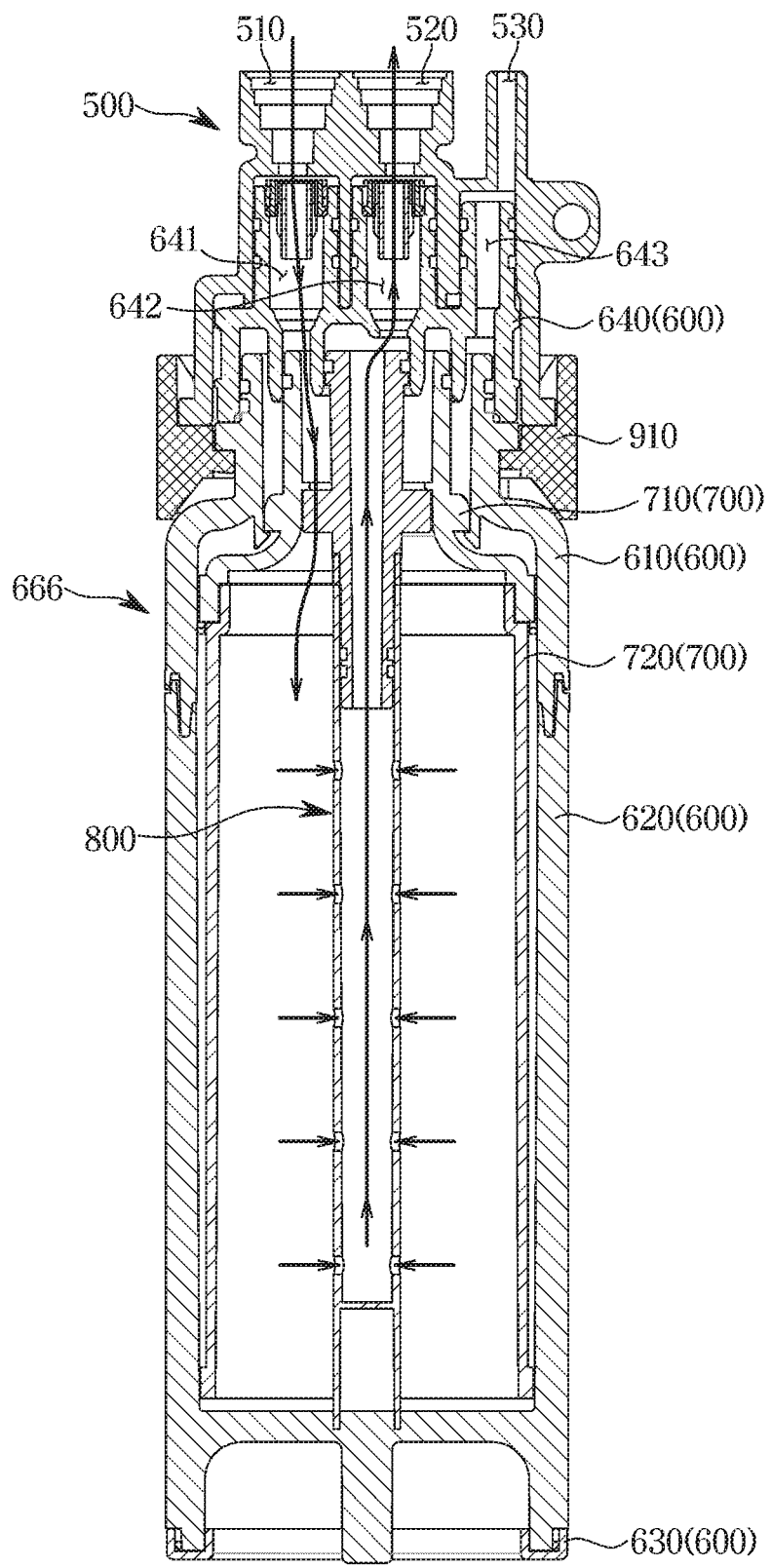
FIG. 6 is a diagram illustrating the flow of water in the filter of FIG. 5 when the raw water is filtered as shown in FIG. 2 according to an embodiment of the disclosure.
Figure 7:
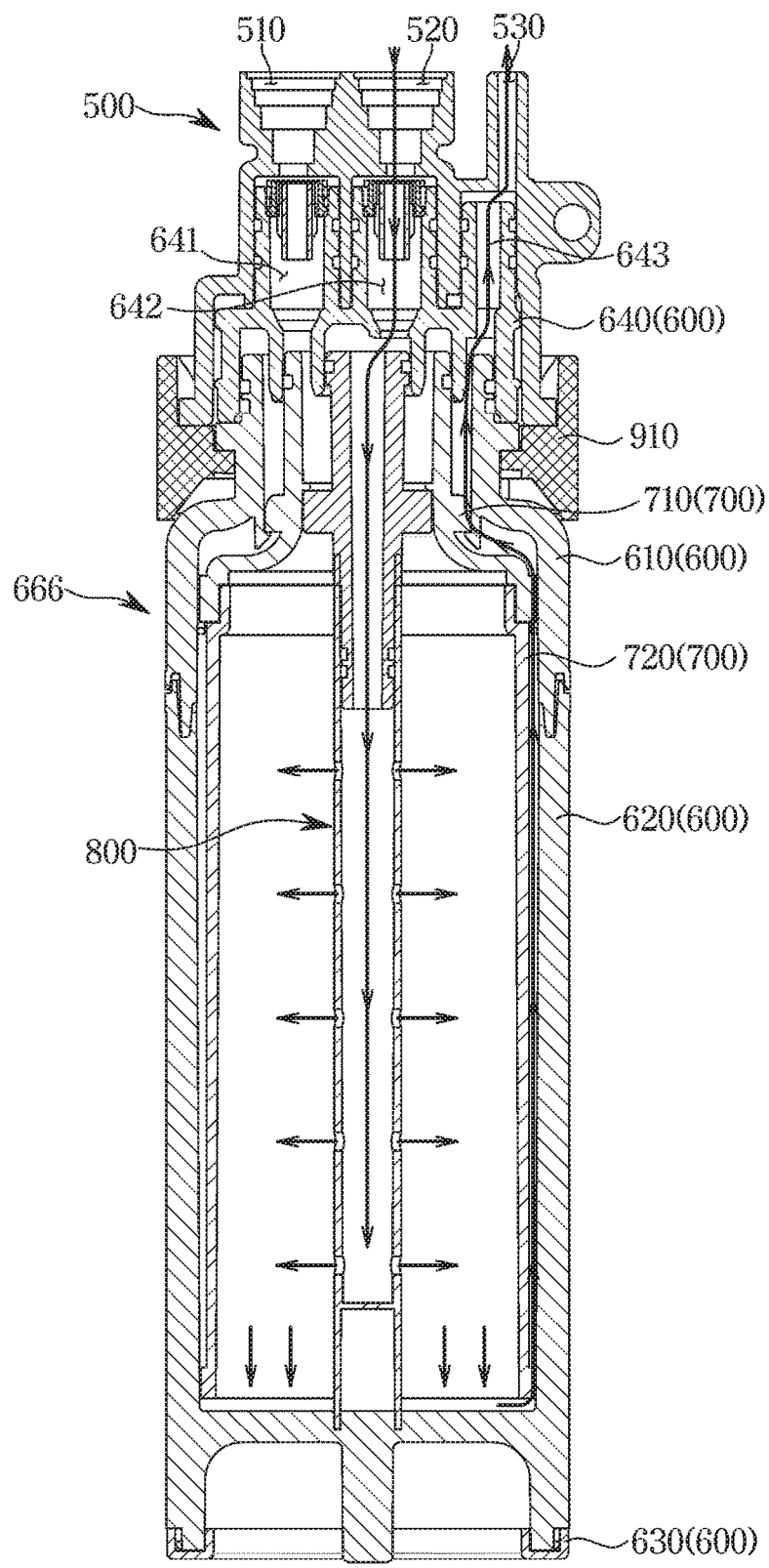
FIG. 7 is a cross-sectional view illustrating the flow of water in the filter of FIG. 5 when the filter is washed shown in FIG. 3 according to an embodiment of the disclosure.

FIG. 5 is a cross-sectional view of a filter of a water purifier according to an embodiment of the disclosure. FIG. 6 is a diagram illustrating the flow of water in the filter of FIG. 5 when the raw water is filtered as shown in FIG. 2 according to an embodiment of the disclosure. FIG. 7 is a cross-sectional view illustrating the flow of water in the filter of FIG. 5 while the filter is washed shown in FIG. 3 according to an embodiment of the disclosure.

Referring to FIG. 5, the first filter 330 may include a filter cap 500, a fastening member 910, and a filter housing 666.

The filter cap 500 may be shaped like a lid formed on one side of the first filter 330 and having internal space. The filter cap 500 may also include through holes to connect to the respective flow paths. The through holes may include a raw water inlet 510, a purified water outlet 520, and a drain outlet 530.

The raw water inlet 510 may be connected to the first purified water flow path 121 to bring in raw water. The purified water outlet 520 may be connected to the second purified water flow path 122 to release purified water filtered from the filter. The drain outlet 530 may be connected to the drain water flow path 130 to release wash water containing contaminants to the outside while a filter is washed. All the raw water inlet 510, the purified water outlet 520, and the drain outlet 530 may be arranged in parallel.

The filter housing 666 may include an installation portion 640 arranged in a receiving space inside the filter cap 500 and formed to have a shape corresponding to the inner surface of the filter cap 500. The installation portion 640 may be coupled to the filter cap 500. The installation portion 640 may also include a raw water inflow portion 641 linked to the raw water inlet 510, a purified water outflow portion 642 linked to the purified water outlet 520, and a drain portion 643 linked to the drain outlet 530. In this case, nozzles for facilitating water inflow and outflow may be coupled to the raw water inflow portion 641 and the purified water outflow portion 642.

Furthermore, the filter housing 666 may include an outer housing 600 and an inner housing 700.

The outer housing 600 defines the outer look of the filter. The outer housing 600 may include a first outer housing 610 coupled to the installation portion 640 and having a receiving space inside, a second outer housing 620 formed by extending downwards from the first outer housing 610 and having a receiving space inside, and a third outer housing 630 having the shape of a ring that defines the bottom of the first filter 330. The second outer housing 620 may have a cylindrical form.

The inner housing 700 may be formed a distance apart from the outer housing 600 and may have a receiving space inside. The inner housing 700 may include a first inner housing 710 coupled to the installation portion 640 and placed in the receiving space of the first outer housing 610, and a second inner housing 720 formed by extending downwards from the first inner housing 710 and shaped like a cylinder with an open bottom.

The inner housing 700 may include a filter body 800 that filters the raw water in the receiving space. The filter body 800 may be coupled to the installation portion 640 and accommodated in the first inner housing 710.

Referring to FIGS. 2 and 6, in the water purification mode, the raw water flows in the first purified water flow path 121 in the first direction. The raw water is brought in through the raw water inlet 510 and passes the raw water inflow portion 641 of the installation portion 640. The raw water then passes the first inner housing 710 and flows into the receiving space of the second inner housing 720. The wash water discharge valve 50 installed in the drain water flow path 130 is closed and the purified water inflow valve 30 installed in the purified water flow path 120 is opened, so that the raw water accommodated flows into the filter body 800 and is filtered. The purified water filtered flows into the purified water outflow portion 642 of the installation portion 640 and flows in the second purified water flow path 122 through the purified water outlet 520 in the first direction.

Referring to FIGS. 3 and 7, in the filter washing mode, the wash water flows in the second purified water flow path 122 in the second direction. The wash water is brought in through the purified water outlet 520 of the filter cap 500 and passes the purified water outflow portion 642 of the installation portion 640. The wash water then flows into the filter body 800. The wash water flows from inside of the filter body 800 to the outside, washing the filter body 800 by removing contaminants on the outer surface of the filter body 800.

The wash water containing the contaminants of the filter body 800 stays in the receiving space of the second inner housing 720. The purified water inflow valve 30 installed in the purified water flow path 120 is closed and the wash water discharge valve 50 installed in the drain water flow path 130 is opened, so that the wash water may flow to the opening on the bottom of the inner housing 700. The wash water having passed through the opening may flow back upwards along the gap between the inner housing 700 and the outer housing 600. The wash water may pass the drain portion 643 and flow to the drain outlet 530 of the filter cap 500. The wash water may flow into the drain water flow path 130 connected to the drain outlet 530. This may make the wash water that has washed the filter discharged to the outside.

Figure 8:
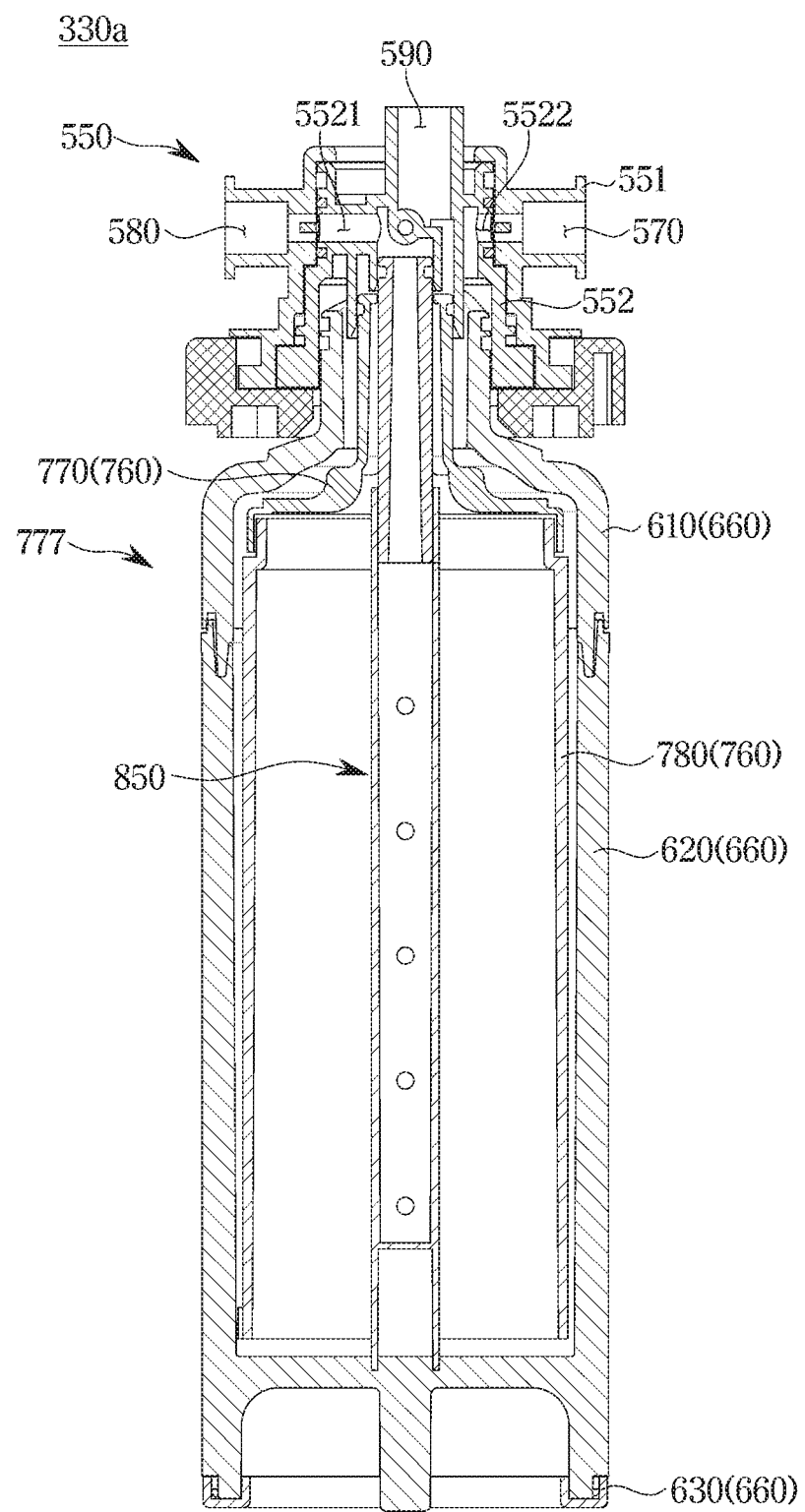
FIG. 8 is a cross-sectional view of a filter of a water purifier, according to an embodiment of the disclosure.
Figure 9:
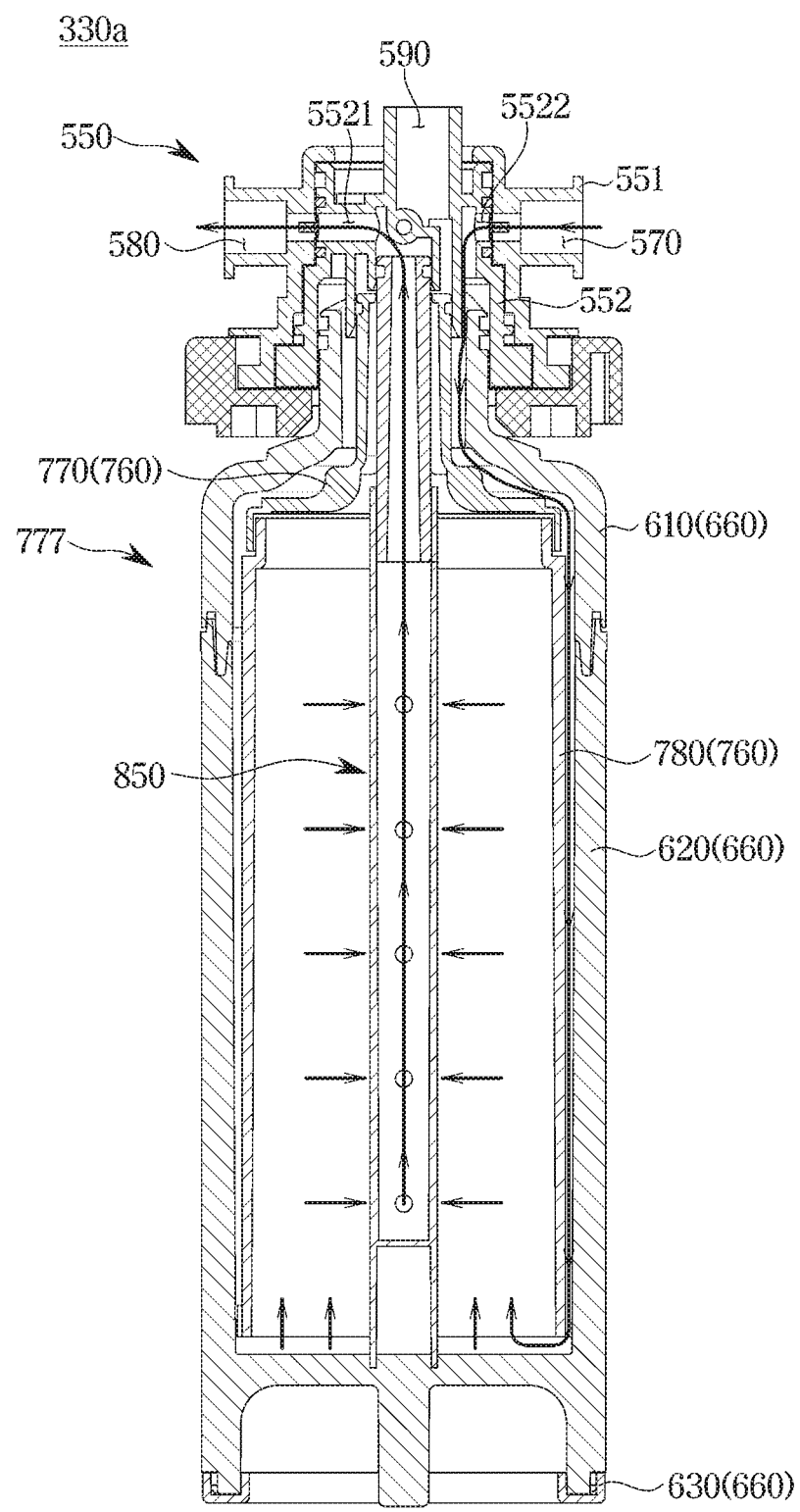
FIG. 9 is a cross-sectional view illustrating the flow of water in the filter of FIG. 8 when the raw water is filtered as shown in FIG. 2 according to an embodiment of the disclosure.
Figure 10:
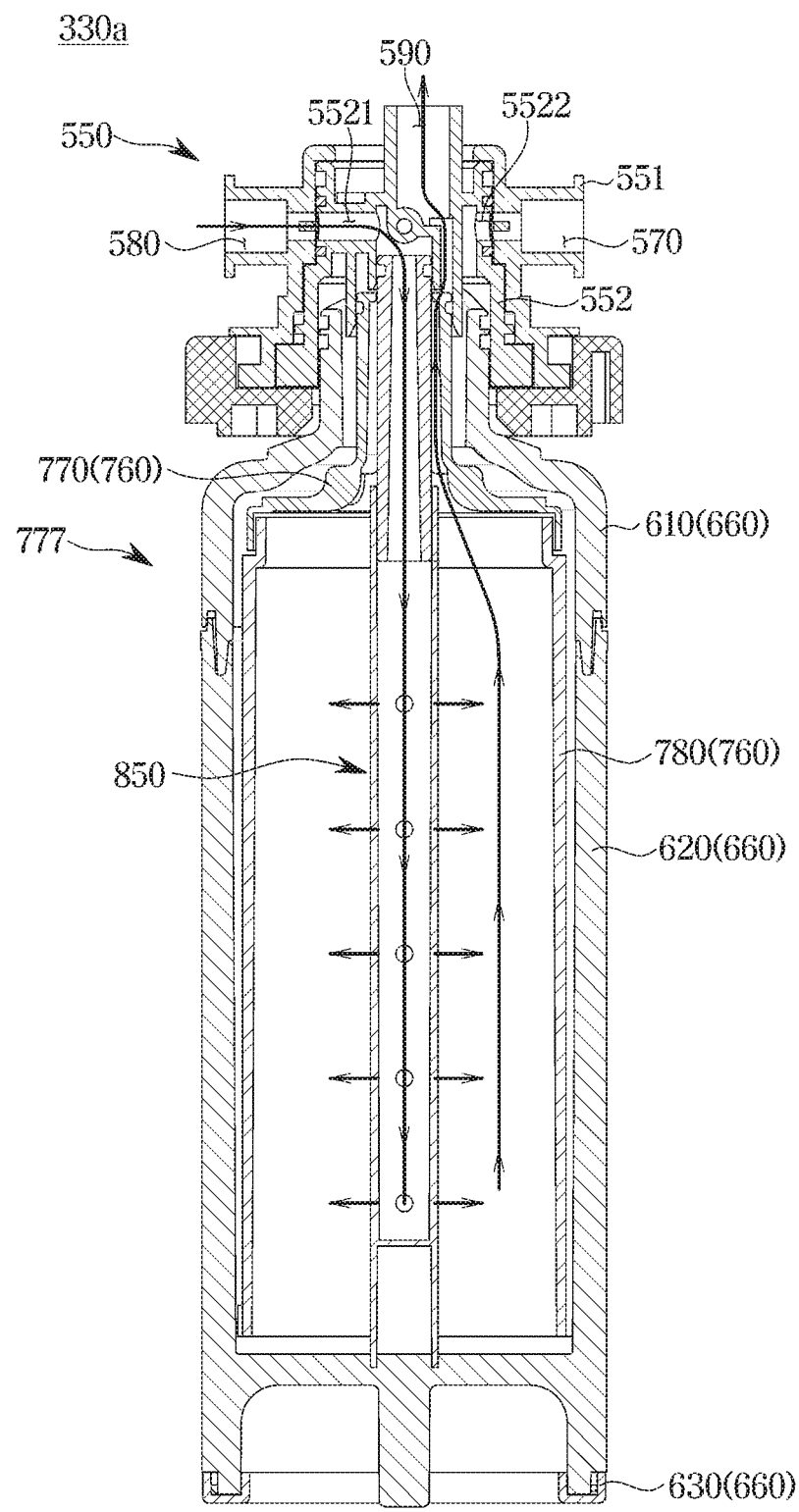
FIG. 10 is a cross-sectional view illustrating the flow of water in the filter of FIG. 8 when the filter is washed shown in FIG. 3 according to an embodiment of the disclosure.

FIG. 8 is a cross-sectional view of a filter of a water purifier, according to another embodiment of the disclosure. FIG. 9 is a diagram illustrating the flow of water in the filter of FIG. 8 when the raw water is filtered as shown in FIG. 2 according to an embodiment of the disclosure. FIG. 10 is a cross-sectional view illustrating the flow of water in the filter of FIG. 8 while the filter is washed shown in FIG. 3 according to an embodiment of the disclosure.

Referring to FIG. 8, a first filter 330a may include a filter cap 550, the fastening member 910, and a filter housing 777. Different features from those of the first filter 330 as shown in FIG. 5 will now be focused.

The filter cap 550 includes a through hole formed on one side of the first filter 330a and connected to a flow path. The filter cap 550 has a receiving space inside and has a dual structure. The filter cap 550 may include a first filter cap 551 and a second filter cap 552.

The filter cap 550 may include a raw water inlet 570, a purified water outlet 580, and a drain outlet 590. Specifically, the first filter cap 551 may include the raw water inlet 570 and the purified water outlet 580. The raw water inlet 570 may be connected to the first purified water flow path 121 to bring in raw water. The purified water outlet 580 may be connected to the second purified water flow path 122 to release purified water filtered from the filter.

The second filter cap 552 may include the drain outlet 590. The drain outlet 590 may be connected to the drain water flow path 130 to release wash water containing contaminants to the outside while a filter is washed. The second filter cap 552 may include a raw water inflow portion 5521 and a purified water outflow portion 5522 linked to the raw water inlet 570 and the purified water outlet 580, respectively.

The raw water inlet 570 and the purified water outlet 580 may be positioned parallel to each other, and the drain outlet 590 may be positioned perpendicular to the purified water outlet 580.

The filter housing 777 may include an outer housing 660 and an inner housing 760.

The outer housing 660 defines the outer look of the filter 330a, and may be coupled to the second filter cap 552.

The inner housing 760 may be formed a distance apart from the outer housing 660 and may have a receiving space inside. The inner housing 760 may include a first inner housing 770 coupled to the second filter cap 552 and placed in the receiving space of the first outer housing 610, and a second inner housing 780 formed by extending downwards from the first inner housing 770 and having an open bottom.

The inner housing 760 may include a filter body 850 that filters the raw water in the receiving space. The filter body 850 may be coupled to the second filter cap 552.

Referring to FIGS. 2 and 9, in the case of supplying purified water by filtering raw water, the raw water flows in the first purified water flow path 121 in the first direction. The raw water is brought in through the raw water inlet 570 and passes the raw water inflow portion 5521 of the second filter cap 552. The raw water may flow into the gap between the inner housing 760 and the outer housing 660 and then into the receiving space of the second inner housing 780. The wash water discharge valve 50 installed in the drain water flow path 130 is closed, so that the raw water accommodated flows into the filter body 850 and is filtered. The purified water inflow valve 30 installed in the purified water flow path 120 is opened, so that the purified water filtered flows in the second purified water flow path 122 through the purified water release portion 5522 and the purified water outlet 580 of the first filter cap 551.

Referring to FIGS. 3 and 10, in the case of washing the filter, the wash water flows in the second purified water flow path 122 in the second direction. The wash water is brought into the filter body 850 through the purified water outlet 580 of the first filter cap 551. The wash water flows from inside of the filter body 850 to the outside, washing the filter body 850 by removing contaminants on the outer surface of the filter body 850.

The wash water containing the contaminants of the filter body 850 stays in the receiving space of the second inner housing 780. The purified water inflow valve 30 installed in the purified water flow path 120 is closed and the wash water discharge valve 50 is opened, so that the wash water may flow up the inner housing 760 and pass the drain outlet 590 of the second filter cap 552. The wash water may be released to the outside through the drain water flow path 130 connected to the drain outlet 590.

Figure 11:
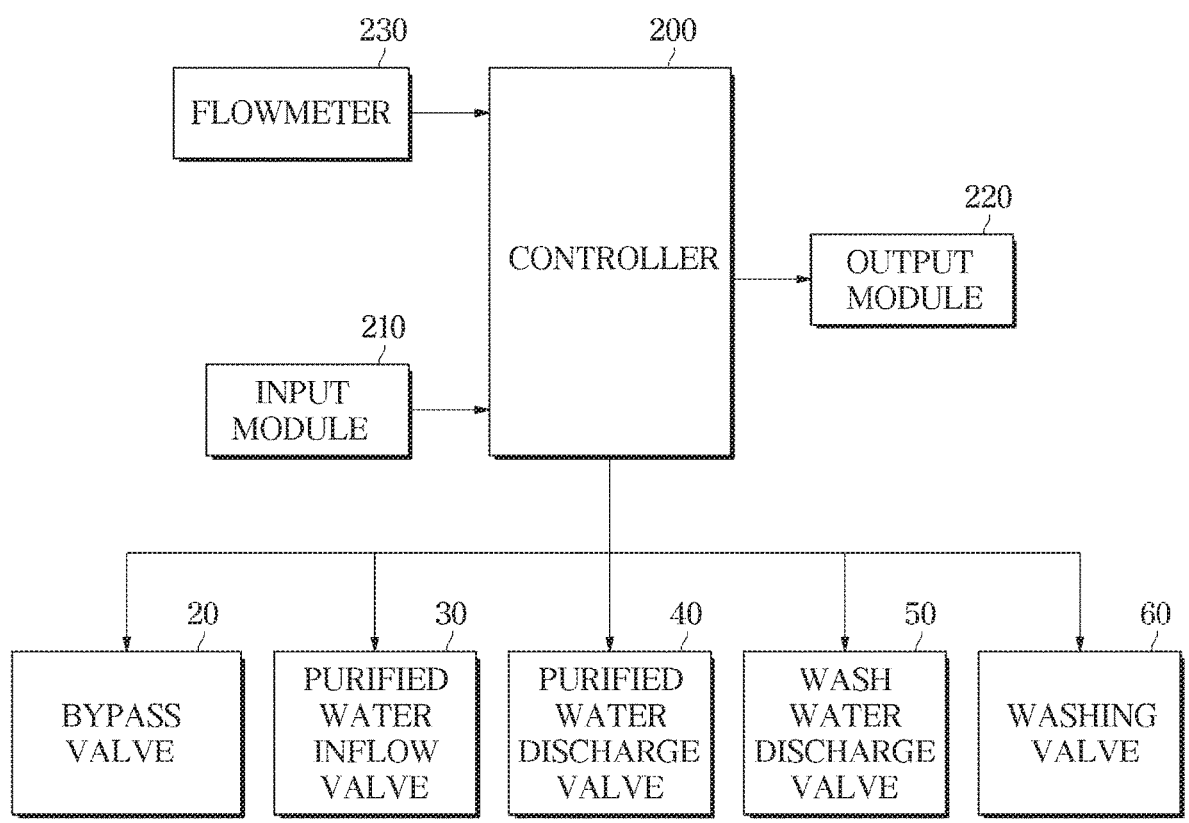
FIG. 11 is a block diagram illustrating a procedure in which a water purifier washes a water purification filter automatically or manually according to an embodiment of the disclosure.

FIG. 11 is a block diagram illustrating a procedure of washing a water purification filter automatically or manually according to an embodiment of the disclosure.

Referring to FIG. 11, a controller 200 (e.g., including at least one processor) may open or close a valve. The user may set a washing cycle or a standard amount of purified water, based on which to wash the filter. The flowmeter 230 installed in a flow path may measure an amount of purified water to inform the controller 200 of the amount of purified water, or the controller 200 may detect the lapse of time.

When the set amount of purified water or the washing cycle is reached, the controller 200 closes the purified water inflow valve 30 and the purified water discharge valve 40 and opens the bypass valve 20, the wash water discharge valve 50, and the washing valve 60, making the filter washed automatically.

Furthermore, the controller 200 may send a signal to the output module 220 or receive a signal from the input module 210, and open or close a valve. The user may set a washing cycle or a standard amount of purified water, based on which to wash the filter. The flowmeter 230 installed in a flow path may measure an amount of purified water to inform the controller 200 of the amount of purified water, or the controller 200 may detect the lapse of time.

When the set amount of purified water or the cycle is reached, the controller 200 may display the event through an output module 220. The user may enter whether to wash the filter into an input module 210. The input module 210 sends a signal including whether to wash the filter to the controller 200. When the controller 200 receives the signal from the input module 210 to wash the filter, it closes the purified water inflow valve 30 and the purified water discharge valve 40, and opens the bypass valve 20, the wash water discharge valve 50, and the washing valve 60. As such, the filter may be washed manually.

Figure 12:
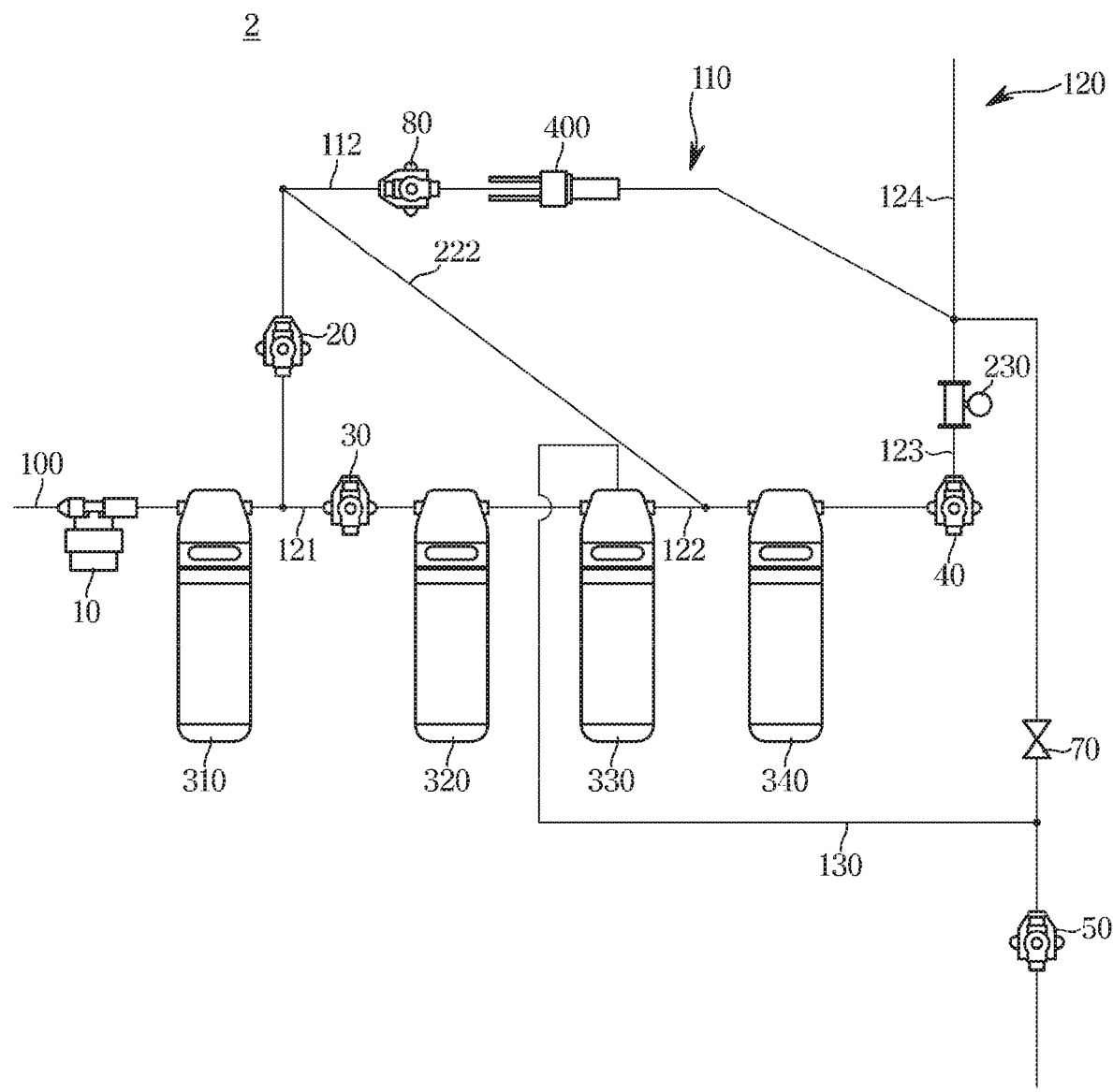
FIG. 12 is a diagram illustrating a water purifier according to an embodiment of the disclosure.

FIG. 12 is a diagram illustrating a water purifier, according to another embodiment of the disclosure. Different parts than in the water purifier as shown in FIG. 1 will now be described according to an embodiment of the disclosure.

Referring to FIG. 12, a water purifier 2 may include the raw water flow path 100 provided to bring in raw water from the outside. The water purifier 2 may include the purified water flow path 120 connected to the raw water flow path 100 for the raw water to flow in a first direction. The purified water flow path 120 may include the first filter 330 arranged therein for filtering the raw water.

The water purifier 2 may include a bypass flow path 110 branched from the purified water flow path 120 for the raw water to bypass the first filter 330, and connected to the purified water flow path 120 on the downstream side of the first filter 330 in the first direction.

The bypass flow path 110 may include a bypass valve 20 for opening or closing the flow path to allow or not allow the raw water to flow in the bypass flow path 110. The bypass flow path 110 may further include the sterilization water producing device 400 for producing sterilized water. The bypass flow path 110 may include the sterilization flow path 112 including the sterilization water producing device 400. The sterilization flow path 112 may include a washing valve 80. The sterilization water producing device 400 may include an electrolysis device, a UV lamp, or an LED module.

The water purifier 2 may include a washing flow path 222 branched from the bypass flow path 110 on the upstream side in the first direction of the sterilization water producing device 400. The washing flow path 222 may be connected to the purified water flow path 120 on the downstream side of the first filter 330 in the first direction. A point at which the washing flow path 222 is branched from the bypass flow path 110 is different from that of the washing flow path 111 of FIG. 1.

When the water purification filter is washed, raw water is brought in the raw water flow path 100. The decompression valve 10 may decompress the raw water. The raw water may be primarily filtered by the second filter 310. The bypass valve 20 is opened and the purified water inflow valve 30 is closed, so that the raw water may flow into the bypass flow path 110. The washing valve 80 located in the sterilization flow path 112 is closed, so that the raw water may be guided to the washing flow path 222. The purified water discharge valve 40 is closed and the wash water discharge valve 50 is opened, so that the raw water having passed the washing flow path 222 may flow in the second direction opposite to the first direction. The raw water flowing in the second direction may wash the first filter 330 by passing the first filter 330, and may be discharged to the outside through the drain flow path 130. In this case, unlike what is shown in FIG. 1, the filter may be washed by the raw water instead of the sterilized water.

On the other hand, when tube washing is performed, the washing valve 80 is opened and the purified water discharge valve and the wash water discharge valve 50 are closed, so that the raw water may pass the sterilization water producing device 400. Accordingly, the raw water may turn to sterilized water. The sterilized water may flow along and wash the fourth purified water flow path 124.

According to the disclosure, a filter may be washed on the gravity basis, thereby washing the filter in a short time.

Furthermore, sterilized water may be used to sterilize microorganisms, and washing the filter may be performed automatically or manually.

Moreover, flow paths may be simply designed by providing a raw water inlet, a purified water outlet, and a drain outlet on a filter cap, thereby minimizing the use of a valve.

In addition, when a washing cycle or a set amount of purified water is reached, the filter may be washed automatically or manually.

While the disclosure has been shown and described with reference to various embodiments thereof, it will be understood by those skilled in the art that various changes in form and detail may be made therein without departing from the spirit and scope of the disclosure as defined by the appended claims and their equivalents.

What is claimed is:

1. A water purifier comprising:
    a raw water flow path formed to bring in raw water from the outside;
    a purified water flow path connected to the raw water flow path for the raw water to flow in a first direction;
    a filter located in the purified water flow path to filter the raw water;
    a bypass flow path branched from the purified water flow path for the raw water to bypass the filter and connected to the purified water flow path on a downstream side of the filter in the first direction;
    a washing flow path branched from the bypass flow path and connected to the purified water flow path on the downstream side of the filter in the first direction;
    a purified water discharge valve configured to open or close the purified water flow path for the raw water having passed through the bypass flow path or the washing flow path to flow in the purified water flow path in the first direction or a second direction opposite to the first direction; and
    a drain flow path connected to the filter to guide the raw water flowing into the filter to the second direction,
    wherein the filter comprises:
        a raw water inlet through which raw water flowing in the first direction is introduced,
        a purified water outlet through which filtered purified water is released, and
        a drain outlet through which wash water having washed the filter is discharged, and
    wherein, based on the filter being washed, the raw water flowing in the second direction is introduced into the filter through the purified water outlet and discharged from the filter through the drain outlet.

2. The water purifier of claim 1, wherein the filter comprises:
    a filter cap formed on one side of the filter and connected to the purified water flow path and the drain flow path;
    a filter housing coupled to the filter cap and formed by extending from the filter cap; and
    a filter body provided inside the filter housing to filter the raw water, and
    wherein the raw water inlet, the purified water outlet, and the drain outlet are provided on the filter cap.

3. The water purifier of claim 2, wherein the filter housing comprises:
    an outer housing defining an outer look of the filter; and
    an inner housing formed apart from the outer housing and accommodating the filter body.

4. The water purifier of claim 3, wherein, based on the filter being washed, wash water having washed the filter flows into a gap between the outer housing and the inner housing and is discharged to the outside.

5. The water purifier of claim 1, wherein the bypass flow path comprises:
    a sterilization water producing device to allow washing with sterilized water based on the filter being washed or a flow path being washed.

6. The water purifier of claim 5, wherein the bypass flow path comprises:
    a sterilization flow path including the sterilization water producing device; and
    a connection flow path connected to the sterilization flow path.

7. The water purifier of claim 1, further comprising:
a purified water inflow valve installed in the purified water flow path to check flows of the raw water into the purified water flow path.

8. The water purifier of claim 7, further comprising:
a filter washing mode in which, for washing the filter,
wherein the purified water discharge valve and the purified water inflow valve are closed for the raw water to pass the bypass flow path and the washing flow path and flow in the purified water flow path in the second direction.

9. The water purifier of claim 7, further comprising:
at least one processor configured to:
control the purified water discharge valve and the purified water inflow valve and receive information about an amount of purified water measured from a flowmeter, and
control the filter to be washed automatically based on a set amount of purified water being reached.

10. A water purifier comprising:
a raw water flow path formed to bring in raw water from the outside;
a purified water flow path connected to the raw water flow path for the raw water to flow in a first direction;
a filter located in the purified water flow path to filter the raw water;
a bypass flow path branched from the purified water flow path for the raw water to bypass the filter, and connected to the purified water flow path on a downstream side of the filter in the first direction, the bypass flow path including a sterilization water producing device;
a washing flow path branched from the bypass flow path and connected to the purified water flow path on the downstream side of the filter in the first direction;
a purified water discharge valve configured to open or close the purified water flow path for the raw water having passed through the bypass flow path or the washing flow path to flow in the purified water flow path in the first direction or a second direction opposite to the first direction;
a purified water inflow valve installed in the purified water flow path to check flows of the raw water into the purified water flow path from the raw water flow path; and
a drain flow path connected to the filter for sterilized water flowing in the second direction to be introduced into the filter and for the introduced sterilized water to be discharged,
wherein based on the purified water discharge valve and the purified water inflow valve being closed, the filter is washed with the sterilized water.

11. The water purifier of claim 10, wherein the filter comprises:
a filter cap formed on one side of the filter and including through holes connected to the purified water flow path and the drain flow path;
a filter housing coupled to the filter cap and formed by extending from the filter cap; and
a filter body provided inside the filter housing to filter the raw water.

12. The water purifier of claim 11, wherein the through holes of the filter cap comprises:
a raw water inlet, through which the raw water flowing in the first direction is introduced;
a purified water outlet through which purified water filtered by the filter body is released; and
a drain outlet through which wash water having washed the filter is discharged.

13. The water purifier of claim 12, wherein based on the filter being washed, the sterilized water having passed through the washing flow path is introduced through the purified water outlet.

14. The water purifier of claim 13,
wherein the filter housing comprises:
an outer housing defining an outer look of the filter; and
an inner housing formed apart from the outer housing,
wherein the drain outlet is linked to a gap between the outer housing and the inner housing, and
wherein the sterilized water introduced through the purified water outlet washes the filter body, flows into the gap between the outer housing and the inner housing, and is discharged to the outside through the drain outlet.

15. The water purifier of claim 10,
wherein the washing flow path comprises:
a washing valve checking flows of the sterilized water having passed through the sterilization water producing device into the washing flow path, and
wherein based on the purified water discharge valve being opened and the purified water inflow valve and the washing valve being closed, a portion of the purified water flow path is washed by the sterilized water having passed through the bypass flow path and flowing in the purified water flow path in the first direction.

16. The water purifier of claim 10,
wherein the drain flow path comprises:
a wash water discharge valve checking flows of the raw water or sterilized water introduced into the filter into the drain flow path, and
wherein the wash water discharge valve is opened for wash water having washed the filter to be discharged to the outside through the drain flow path.

17. The water purifier of claim 10, further comprising:
at least one processor configured to:
control opening or closing the purified water discharge valve and the purified water inflow valve, and
control the filter to be washed automatically based on a set washing cycle being reached.

18. The water purifier of claim 10, further comprising:
an output module displaying information about whether a set washing cycle is reached;
an input module for entering a user input to wash the filter; and
at least one processor configured to:
control opening or closing the purified water discharge valve and the purified water inflow valve,
send a signal to the output module, and
receive a signal from the input module,
wherein the filter is washed manually through an input from a user.

* * * * *